United States Patent
Deuble et al.

(10) Patent No.: US 8,365,851 B2
(45) Date of Patent: Feb. 5, 2013

(54) MOTOR VEHICLE HAVING A HYBRID DRIVE, AND METHOD FOR OPERATING A HYBRID DRIVE

(75) Inventors: Peter Deuble, Moeglingen (DE); Jens-Werner Falkenstein, Aalen (DE); Manfred Stahl, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 825 days.

(21) Appl. No.: 12/087,024

(22) PCT Filed: Nov. 23, 2006

(86) PCT No.: PCT/EP2006/068830
§ 371 (c)(1),
(2), (4) Date: Sep. 3, 2009

(87) PCT Pub. No.: WO2007/074002
PCT Pub. Date: Jul. 5, 2007

(65) Prior Publication Data
US 2010/0000812 A1 Jan. 7, 2010

(30) Foreign Application Priority Data
Dec. 22, 2005 (DE) .......................... 10 2005 061 398

(51) Int. Cl.
*B60W 10/00* (2006.01)

(52) U.S. Cl. ................. 180/65.265; 180/65.275

(58) Field of Classification Search ............... 180/65.28, 180/65.23, 65.27, 65.275, 65.21, 65.265; 477/3, 5; 903/945, 946
See application file for complete search history.

(56) References Cited

U.S. PATENT DOCUMENTS

| | | | | |
|---|---|---|---|---|
| 6,019,698 A * | 2/2000 | Lawrie et al. | | 477/5 |
| 6,209,672 B1 * | 4/2001 | Severinsky | | 180/65.23 |
| 6,338,391 B1 * | 1/2002 | Severinsky et al. | | 180/65.23 |
| 6,852,062 B1 * | 2/2005 | Ahner et al. | | 180/65.25 |
| 7,104,347 B2 * | 9/2006 | Severinsky et al. | | 180/65.23 |
| 7,237,634 B2 * | 7/2007 | Severinsky et al. | | 180/65.23 |
| 7,392,871 B2 * | 7/2008 | Severinsky et al. | | 180/65.28 |
| 7,455,134 B2 * | 11/2008 | Severinsky et al. | | 180/65.28 |
| 7,520,353 B2 * | 4/2009 | Severinsky et al. | | 180/65.28 |
| 7,559,388 B2 * | 7/2009 | Severinsky et al. | | 180/65.28 |

FOREIGN PATENT DOCUMENTS

| | | |
|---|---|---|
| DE | 102 41 018 | 3/2004 |
| WO | 2006/069833 | 7/2006 |

* cited by examiner

*Primary Examiner* — Hau Phan
(74) *Attorney, Agent, or Firm* — Kenyon & Kenyon LLP

(57) ABSTRACT

A method for operating a motor vehicle having a hybrid drive, including a combustion engine having an engine management and at least one electro machine having a control unit, which is at least intermittently operated in an rpm-regulated manner and which is able to be in operative connection with a drive shaft of the combustion engine. For the closed-loop speed control of the electro machine, its torque is influenced by its rotational speed or a signal derived therefrom.

12 Claims, 2 Drawing Sheets

MOTOR VEHICLE HAVING A HYBRID DRIVE, AND METHOD FOR OPERATING A HYBRID DRIVE

FIELD OF THE INVENTION

The present invention is based on a method for operating a hybrid drive, and on a motor vehicle having a hybrid drive.

BACKGROUND INFORMATION

Motor vehicles having a hybrid drive are discussed in the German patent document DE 10241018 A1, for example. Referred to as hybrid drives are drives in which at least one electro machine is provided in addition to a conventional internal combustion engine; depending on the design of a parallel hybrid drive, this electro machine can be coupled or is fixedly coupled to a drive shaft in the drive train of the motor vehicle and can operate both as generator or as motor. In generator operation, the electro machine is driven by the internal combustion engine and is thus able to generate electric current to supply electric loads of the motor vehicle. In motor operation, current is supplied from the vehicle battery in order to convert this current into driving energy for the motor vehicle or into starter energy for the internal combustion engine. Apart from the vehicle battery as energy store, a flywheel or some other store for kinetic energy may be provided as well, by which kinetic energy released during braking, for example, is storable and can be released via the electro machine to the loads in the vehicle electrical system of the motor vehicle or later to its drive train.

An electric driving operation requires a closed-loop speed control of the electro machine, especially in a number of cases. For an automatic transmission having an open mechanical lockup clutch, and for the oil-pressure supply of a conventional automatic transmission, an input speed of >0 is required, and in electrical driving operation, even for a stationary vehicle, a rotational speed of the electro machine of >0 is therefore required. With an automatic transmission and an open mechanical lockup clutch, the drive-away behavior of a conventional motor vehicle in a torque-controlled operation of the electro machine is representable only inadequately. The driver is expecting a crawl torque when disengaging the brake. In the case of an open mechanical lockup clutch, this requires an electro machine speed of >0, even if the vehicle is at a standstill. To ensure a behavior that corresponds to the standing-start behavior of the combustion engine out of idle speed control of the internal combustion engine, the electro machine must be operated in an rpm-controlled manner. In the case of a hybrid vehicle having manual gear-shifting, the drive-away behavior during electric operation should not differ from the behavior with a running internal combustion engine. The driver is used to a drive-away behavior against an rpm-controlled power unit, using the starting clutch. A drive-away in a torque-controlled operation of the electro machine, starting from a rotational speed of 0, i.e., with a starting clutch that is not depressed and with the gear engaged, is unfamiliar to the driver and should be avoided.

The hybrid operation likewise requires a closed-loop speed control of the electro machine. For future diagnostic and monitoring functions, the electro machine drags the internal combustion engine to a specifiable rotational speed, for example in a drag torque adaptation in no-load running, the internal combustion engine being operated using deceleration fuel cutoff. If corresponding functions are implemented during no-load running, then the electro machine must take over the idle speed control of the internal combustion engine.

Depending on the operating state of the vehicle, it will be necessary to operate the internal combustion engine and the electro machine jointly or separately in an rpm-regulated manner; if a torque is requested, for example by the actuation of the driving pedal, a steady transition into the torque-controlled operation must take place.

SUMMARY OF THE INVENTION

A method is provided for operating a motor vehicle having a hybrid drive, including an internal combustion engine, which has an engine control and at least one electro machine having a control unit, the electro machine being at least intermittently operated in an rpm-regulated manner and able to be in operative connection with a drive shaft of the internal combustion engine. To regulate the rotational speed of the electro machine, its torque is influenced by its rotational speed or a signal derived therefrom. If a torque is requested, for instance by the driver through the actuation of the driving pedal, a continuous transition from the rpm-regulated to the torque-controlled range takes place. In an advantageous manner, the exemplary embodiments and/or exemplary methods of the present invention is able to be used in cases of electric driving and hybrid driving. In electric driving, an interrupting clutch is open, the internal combustion engine is decoupled, and the electro machine is driving the drive shaft. The rotational speed of the electro machine (oil-pressure supply for a conventional automatic transmission, etc.) is regulated. During hybrid driving, the internal combustion engine and the electro machine are active, and the interrupting clutch is closed. The joint rotational speed of internal combustion engine and electro machine is regulated by the electro machine.

In one advantageous method step, the closed-loop speed control is divided into a fast component, e.g., a proportional component, and a slow component, e.g., an integral-action component, the proportional component being calculated in the control unit of the electro machine, and the integral-action component being calculated in a control unit in which a torque path is calculated, and/or in which torque requests, e.g., from the driving pedal or the vehicle speed controller, are read in and/or calculated. Most of the signals required for the transition from rpm-regulated to torque-controlled operation are available there. The calculation of the integral-action component may be implemented in the engine control unit. Since the proportional component is calculated in the control unit of the electro machine, a limitation of the effect of the controller by signal propagation delays between different control units is able to be reduced. High control performance or high dynamics of the control is achievable.

In an advantageous manner, the proportional component is able to respond to deviations between an actual speed and a setpoint speed in a highly dynamic manner, while the integral-action component controls a transition from rpm-regulated operation to a torque-controlled operation of the electro machine. In addition, the integral-action component may be used to compensate for inaccuracies in the closed-loop control system.

In one advantageous method step, the proportional component is limited to a maximum value and a minimum value, the minimum value resulting from the negative value of the integral-action component.

The integral-action component and a requested setpoint torque are advantageously added to the limited proportional component.

In an advantageous manner, if a torque is requested, the integral-action component is frozen, and the setpoint torque is increased in accordance with the requested torque. When the setpoint torque is increased, the rotational speed of the electro machine rises.

With a rising setpoint torque, a falling, negative proportional component is able to compensate the frozen integral-action component as the deviation of the rotational speed from a rotational speed setpoint value increases. An overcompensation of the integral-action component is avoided due to the limitation of the proportional component to the negative value of the integral-action component.

As soon as the rotational speed exceeds a rotational-speed threshold above the setpoint value of the rotational speed, a torque-controlled operation automatically results in an advantageous manner.

A motor vehicle having a hybrid drive is provided, which includes an internal combustion engine having an engine control unit and at least one electro machine, which is at least intermittently rpm-controlled and which is able to be in operative connection with a drive shaft of the internal combustion engine; a controller having a fast component, e.g., a proportional component, and a slow component, e.g., an integral-action component, is provided for the closed-loop speed control, the fast component and the slow component being accommodated in different control units. Because of the hardware distribution, high control performance is able to be achieved.

In one advantageous development, the integral-action component is integrated in the control unit, which may be in the engine control, in which a torque path is calculated and/or in which torque requests are read in and/or calculated. Most of the information necessary for a torque-controlled operation is available in the control unit in which the integral-action component is calculated.

In one advantageous development, the proportional component is integrated in the control unit of the electro machine. This hardware partitioning (which may be used) results in a small interface width between the control units, and in high control performance or high dynamics of the control.

Additional specific embodiments, aspects and advantages of the exemplary embodiments and/or exemplary methods of the present invention also derive, independently of their combination in the claims and without limiting the universality, from an exemplary embodiment of the present invention presented below with reference to the drawings.

DETAILED DESCRIPTION

Figure 1A:
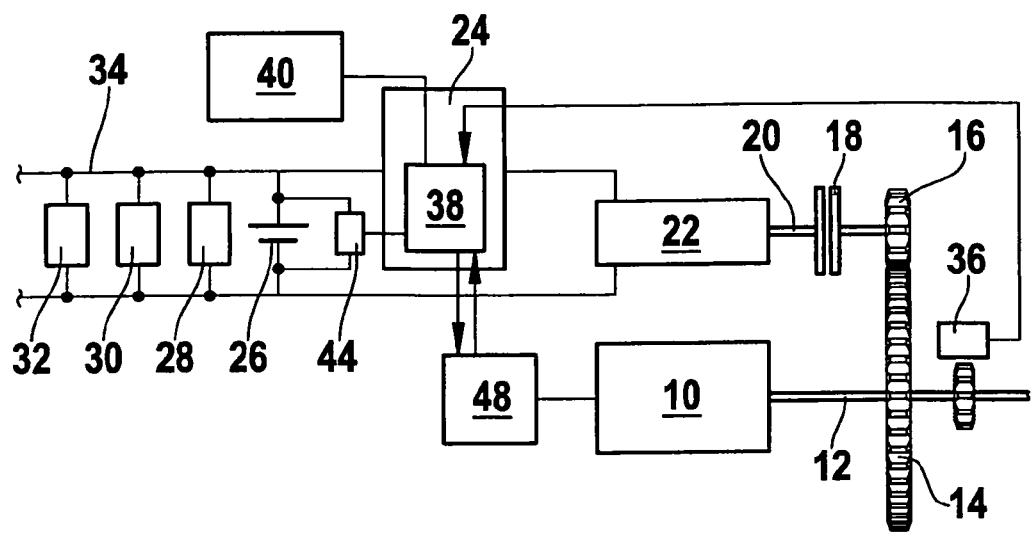
FIG. 1a shows a schematic of an exemplary motor vehicle having a hybrid drive.
Figure 1B:
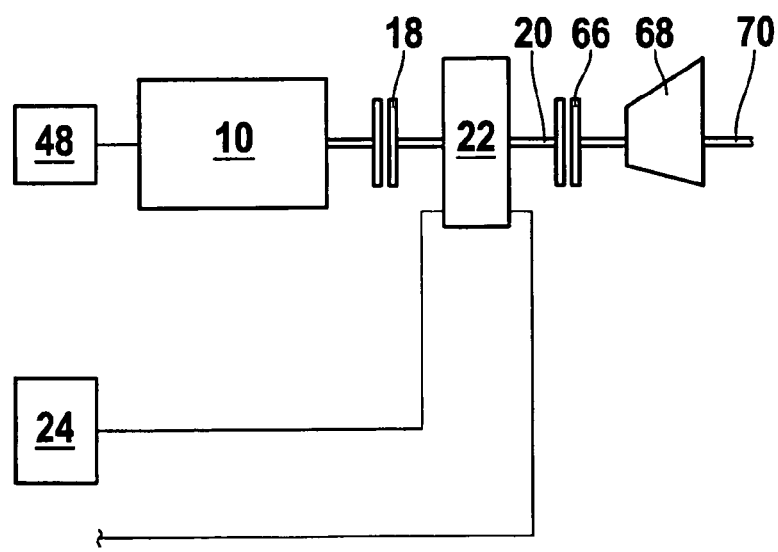
FIG. 1b shows one example with a decoupled combustion engine during electric driving.

The hybrid drive of an exemplary motor vehicle, shown in FIG. 1a by way of example, as usual includes a combustion engine 10, whose crankshaft 12 is able to be coupled to driven shaft 20 of an electro machine 22 of the motor vehicle via two gear wheels 14, 16 and a clutch 18 acting as interrupting clutch, in particular. By way of example, FIG. 1b shows a hybrid drive for electric driving using combustion engine 10 decoupled from electro machine 22, i.e., with an open clutch 18. The output for the remaining drive train (starting clutch 66, gearing 68, drive wheels) takes place at driven shaft 20 of electro machine 22.

Electro machine 22 has a control unit 24 and is connected via this control unit 24 to a battery 26 of the motor vehicle, which supplies direct current to a multitude of loads 28, 30, 32 etc. in a vehicle electrical system 34. Loads 28, 30, 32 may encompass all power units of the motor vehicle that are operated by current, such as the rear-window defroster, the radio, the glow plug, and the individual lights of the lighting system. Furthermore, control unit 24 is connected to, for example, an angular-position sensor 36 for determining the rotational speed of crankshaft 12. In addition, control unit 24 is connected to a sensor (not shown further), which records the angle of rotation of driven shaft 20 of electro machine 22.

Electro machine 22 is used, for example, as starter generator for combustion engine 10. Upon each start of the motor vehicle, it is first brought to a specified rotational speed by a current supply from battery 26, whereupon clutch 18 is closed and combustion engine 10 is started by electro machine 22 in a torque-controlled or rpm-regulated manner. As soon as combustion engine 10 has reached a specified idling speed, control unit 24 infers the starting end on the basis of the signals from angular-position sensor 36. Afterwards, combustion engine 10 is able to be operated with the aid of electro machine 22 and control unit 24, in an rpm-regulated manner, for example, electro machine 22 ensuring that the specified idling speed is maintained.

Control unit 24 of electro machine 22 is equipped with a computer 38, to which a central on-board computer 40 of the motor vehicle transmits the on-position of individual loads 28, 30, 32 of vehicle electrical system 34. In addition, computer 38 is connected to a battery controller 44, which determines the instantaneous terminal voltage and the instantaneous charge state of battery 26 and, if necessary, ensures recharging of battery 26, for example when the charge state drops below 70%.

Figure 2:
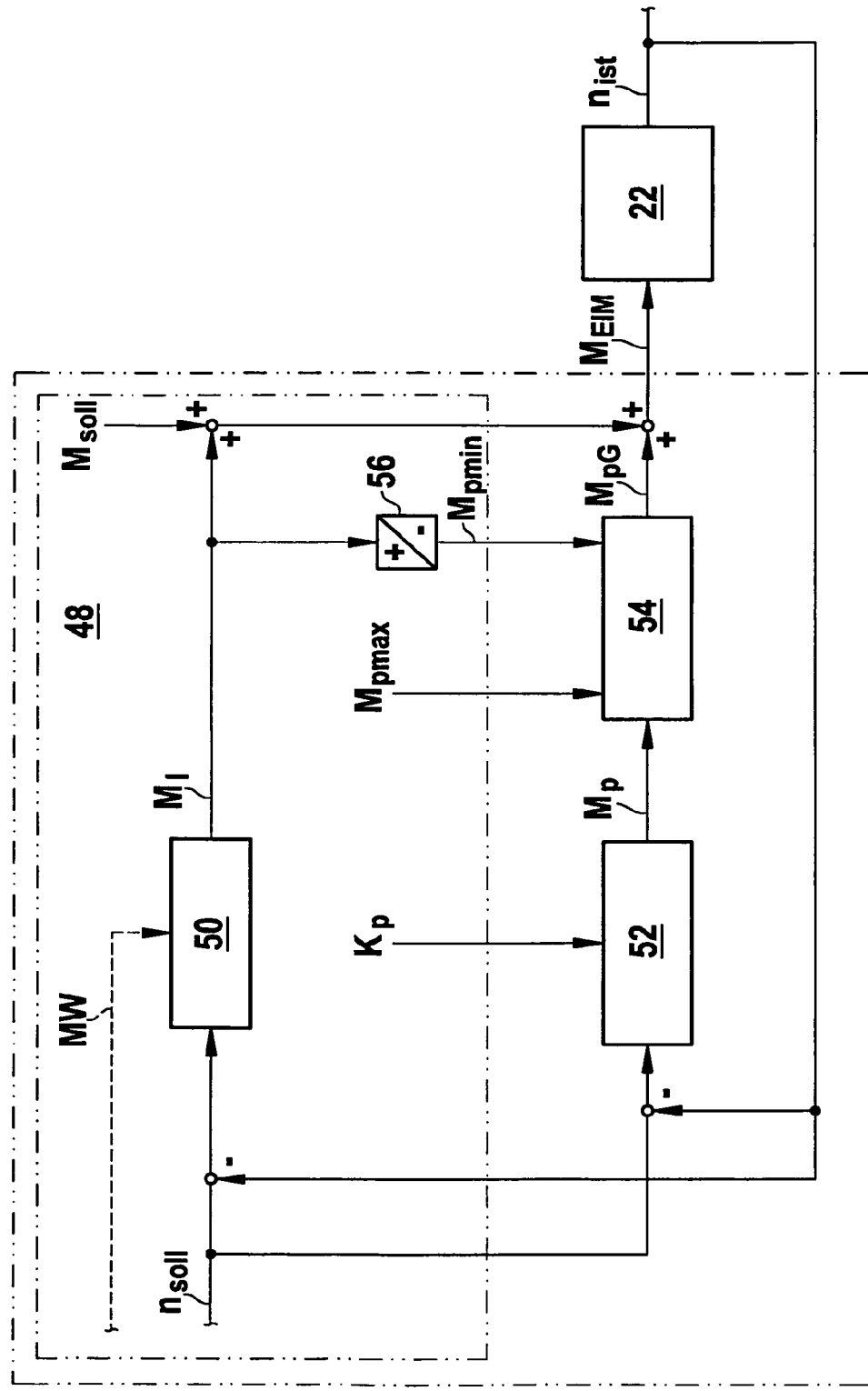
FIG. 2 shows a graphic representation of a signal-flow diagram for speed-controller coordination of a hybrid drive.

Combustion engine 10, designed as diesel engine, for example, has an engine management 48, which is in connection with control unit 24 of electro machine 22, as can be gathered from the signal-flow diagram from FIG. 2 for the transition from rpm-regulated operation of electro machine 22 to torque-controlled operation. Identical elements are provided with the same reference symbols. In engine management device 48, the torque path is calculated, and a datum MW, which indicates a desired torque, such as from the driving pedal or the vehicle speed controller, is read in and/or calculated.

Engine speed $n_{ist}$ of electro machine 22 is regulated with the aid of a proportional-integral controller, whose slow integral-action component $M_I$ is calculated in an integral-action controller 50 in engine management device 48 of combustion engine 10, and whose fast proportional component $M_p$ is calculated in a proportional controller 52 of control unit 24 of electro machine 22. The proportional-integral controller is thus partitioned in its hardware and distributed to different control devices.

Integral-action controller 50 receives a torque request MW and, as input, a setpoint value $n_{soll}$ of the rotational speed, and outputs an integral-action component $M_I$.

Proportional controller 52 likewise receives setpoint speed $n_{soll}$ as input, as well as a controller coefficient $K_p$, and outputs proportional component $M_p$. Proportional component $M_p$ responds very dynamically to deviations of an instantaneous speed $n_{ist}$ from a setpoint speed $n_{soll}$. Proportional component $M_p$ is limited to a maximum value $M_{pmax}$ and a minimum value $M_{pmin}$ using a limiter 54, minimum value $M_{pmin}$ resulting from the negative value of integral-action component $M_I$, which is picked off at the output of integral-action controller 50 and provided with an inverted operational sign in element 56. Integral-action component $M_I$ and requested setpoint torque $M_{soll}$ are added to limited output value $M_{pG}$ of proportional controller 52.

In the absence of a torque request, i.e., without actuation of the driving pedal or the vehicle speed controller, setpoint torque $M_{soll}$ is negative. With an active closed-loop speed control of electro machine 22, a positive integral-action component $M_I$ comes about, which compensates negative $M_{soll}$.

If a torque is requested in that, for example, the driver actuates the driving pedal, proportional component $M_I$ at the output of integral-action controller 50 is frozen. Setpoint torque $M_{soll}$ increases in accordance with the requested torque, for instance given further actuation of the driving pedal.

Due to increased setpoint torque $M_{soll}$, speed $n_{ist}$ of electro machine 22 rises. A falling, negative proportional component $M_p$ is the result, which compensates frozen integral-action component $M_I$ as the deviation between rotational speed $n_{ist}$ and rotational speed setpoint value $n_{soll}$ increases. Since proportional component $M_p$ is limited to the negative value of integral-action component $M_I$, an overcompensation is avoided. If rotational speed $n_{ist}$ lies above rotational speed setpoint value $n_{soll}$ by a specific difference, then the closed-loop speed control is completely detached, automatically resulting in a torque-controlled operation in which $M_{EIM}=M_{soll}$ applies. Integral-action component $M_I$ therefore controls a transition from rpm-regulated operation to a torque-controlled operation of electro machine 22. Variable $M_{EIM}$ is forwarded to electro machine 22, from whose output rotational speed $n_{ist}$ is returned to integral-action controller 50 and proportional controller 52.

Controller coefficient $K_p$ of proportional controller 52, rotational speed setpoint value $n_{soll}$, and the parameters of the proportional limitation in limiter 54 are generated in engine management 48 of combustion engine 10 and thus may be influenced and coordinated by the vehicle control.

What is claimed is:

1. A method for operating a motor vehicle having a hybrid drive, the method comprising:
   intermittently operating a combustion engine having an engine management arrangement and at least one electro machine having a control unit in an rpm-regulated manner, and which is operatively connectable with a drive shaft of the combustion engine; and
   influencing, for a closed-loop speed control of the electro machine, its torque by one of its rotational speed and a signal derived therefrom, the closed-loop speed control being divided into a fast component and a slow component.

2. The method of claim 1, wherein the fast component of the closed-loop speed control is determined in the control unit of the electro machine, and the slow component of the closed-loop speed control is determined in a control unit in which at least one of (i) a torque path is determined, and (ii) torque requests are at least one of read in and calculated.

3. The method of claim 2, wherein the fast component responds dynamically to deviations of an actual speed from a setpoint speed.

4. The method of claim 2, wherein the slow component controls a transition from rpm-regulated operation to a torque-controlled operation of the electro machine.

5. The method of claim 1, wherein the fast component is limited to a maximum value and a minimum value, the minimum value resulting from a negative value of the slow component.

6. The method of claim 5, wherein the slow component and a requested setpoint torque are added to a limited fast component.

7. The method of claim 1, wherein the slow component is frozen if a torque is requested, and the setpoint torque is increased in accordance with the requested torque.

8. The method of claim 7, wherein, with a rising setpoint torque, a falling, negative fast component compensates a frozen slow component as a deviation of the rotational speed from a rotational speed setpoint value increases.

9. The method of claim 8, wherein, as soon as the rotational speed exceeds a rotational-speed threshold above the rotational speed setpoint value, a torque-controlled operation comes about.

10. A motor vehicle having a hybrid drive, comprising:
    a combustion engine having an engine management arrangement and at least one, at least intermittently rpm-regulated electro machine, which is operatively connectable with a driven shaft of the combustion engine; and
    a controller, having a fast component and a slow component, for a closed-loop speed control, the fast component and the slow component being accommodated in different control devices.

11. The motor vehicle of claim 10, wherein the slow component is integrated in the control device, in the engine management, in which at least one of (i) a torque path is calculated, and (ii) torque requests are at least one of read in and calculated.

12. The motor vehicle of claim 10, wherein the fast component is integrated in a control unit of the electro machine.

* * * * *

UNITED STATES PATENT AND TRADEMARK OFFICE
CERTIFICATE OF CORRECTION

PATENT NO. : 8,365,851 B2  Page 1 of 1
APPLICATION NO. : 12/087024
DATED : February 5, 2013
INVENTOR(S) : Deuble et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1263 days.

Signed and Sealed this

First Day of September, 2015

Michelle K. Lee
*Director of the United States Patent and Trademark Office*